United States Patent
Chang et al.

(10) Patent No.: US 9,207,525 B2
(45) Date of Patent: Dec. 8, 2015

(54) PHOSPHOR WHEEL AND WHITE LIGHT ILLUMINATION DEVICE UTILIZING THE SAME

(71) Applicant: DELTA ELECTRONICS, INC., Taoyuan Hsien (TW)

(72) Inventors: Keh-Su Chang, Taoyuan Hsien (TW); Yen-I Chou, Taoyuan Hsien (TW); Chi Chen, Taoyuan Hsien (TW); Meng-Han Liu, Taoyuan Hsien (TW); Bor Wang, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 14/312,326

(22) Filed: Jun. 23, 2014

(65) Prior Publication Data

US 2015/0116981 A1    Apr. 30, 2015

(30) Foreign Application Priority Data

Oct. 28, 2013   (TW) .............................. 102138852 A

(51) Int. Cl.
*F21V 9/16* (2006.01)
*G03B 21/20* (2006.01)
*G02B 26/00* (2006.01)

(52) U.S. Cl.
CPC ............ *G03B 21/204* (2013.01); *G02B 26/008* (2013.01)

(58) Field of Classification Search
CPC ..... F21V 14/08; G03B 21/204; G02B 26/008
See application file for complete search history.

(56) References Cited

U.S. PATENT DOCUMENTS

| | | | |
|---|---|---|---|
| 2011/0317171 A1* | 12/2011 | Emtman et al. ................ | 356/609 |
| 2012/0201030 A1* | 8/2012 | Yuan et al. ..................... | 362/293 |
| 2013/0010264 A1* | 1/2013 | Takahashi et al. .............. | 353/20 |
| 2013/0021582 A1* | 1/2013 | Fujita et al. .................... | 353/31 |
| 2013/0088471 A1* | 4/2013 | Kitano .......................... | 345/208 |
| 2013/0235352 A1* | 9/2013 | Hsu et al. ........................ | 353/31 |
| 2013/0242536 A1* | 9/2013 | Weichmann et al. ........... | 362/84 |
| 2013/0250255 A1* | 9/2013 | Kurosaki et al. ................ | 353/85 |
| 2013/0271954 A1* | 10/2013 | Li et al. .......................... | 362/84 |
| 2013/0308295 A1* | 11/2013 | Bartlett ......................... | 362/84 |
| 2014/0118991 A1* | 5/2014 | Lin et al. ........................ | 362/84 |
| 2014/0140038 A1* | 5/2014 | Gerets et al. ................... | 362/84 |
| 2014/0254133 A1* | 9/2014 | Kotter et al. ................... | 362/84 |

FOREIGN PATENT DOCUMENTS

WO    WO 2013007818 A1 *   1/2013   .............. F21V 14/08

* cited by examiner

*Primary Examiner* — Donald Raleigh
(74) *Attorney, Agent, or Firm* — Muncy, Geissler, Olds & Lowe, P.C.

(57) ABSTRACT

Disclosed is a phosphor wheel including a substrate, a first phosphor region on the substrate, and a second phosphor region on the substrate. The first phosphor region and the second phosphor region are concentric patterns without any space between their interface. Moreover, the second phosphor region is set to surround the first phosphor region.

16 Claims, 5 Drawing Sheets

PHOSPHOR WHEEL AND WHITE LIGHT ILLUMINATION DEVICE UTILIZING THE SAME

CROSS REFERENCE TO RELATED APPLICATIONS

This application claims priority of Taiwan Patent Application No. 102138852, filed on Oct. 28, 2013, the entirety of which is incorporated by reference herein.

BACKGROUND OF THE INVENTION

1. Field of the Invention

The present invention relates to white light illumination device, and in particular to a phosphor wheel thereof.

2. Description of the Related Art

In a laser projector, a display light source is composed of a phosphor wheel collocated with a solid-state laser (serving as an excitation light source). The display light can be operated with high work, and its photoluminescence efficiency may largely enhance the electro-optical conversion and lumen output of the laser projector. Accordingly, the laser projector is the most important light source module of next-generation projection technologies of recent years. The conventional designs of the phosphor wheels in the laser projectors are divided into two main types: single region designs as shown in FIG. 1, and multi-region designs as shown in FIG. 2. In FIG. 1, one phosphor or a mixture of a plurality of phosphors is formed on all regions of a wheel-shaped substrate, e.g. a single phosphor region 10. In FIG. 2, phosphors of different colors are separately formed on different regions of a wheel-shaped substrate, e.g. a red phosphor region 2R, a yellow phosphor region 2Y, a green phosphor region 2G, and a blue phosphor region 2B.

The red light efficiency of the phosphor wheel is always the bottleneck of the light source lumen of the laser projector. The red phosphor has an inherently lower efficiency. Moreover, the red phosphor light output will be largely degraded by a high excitation laser watt due to thermal decay. In other words, the red phosphor efficiency not only shifts the D65 white balance of the projector, but also degrades total lumen of the projector. While the laser excitation of high watt is adopted, a yellow phosphor and/or an orange phosphor are usually collocated with a filter to get the desired red light. In the phosphor wheel with a single yellow phosphor region, the yellow phosphor is excited by a blue laser to form a yellow light. The yellow light can be split by a splitter into a green light and a red light, which are combined with the blue laser to serve as an image-forming light source, e.g. RGB light beams. However, the red light efficiency of this modification is still low (about 12 lm/W), thereby limiting the white light lumen efficiency (about 54.9 lm/W). Accordingly, expending the spectrum and efficiency of the red light region is always one of the major topics of the laser projectors.

BRIEF SUMMARY OF THE INVENTION

One embodiment of the disclosure provides a phosphor wheel, comprising: a substrate; a first phosphor region on the substrate; a second phosphor region on the substrate, wherein the first phosphor region and the second phosphor region are concentric patterns without any space between their interface, and the second phosphor region is set to surround the first phosphor region.

One embodiment of the disclosure provides a white light illumination device, comprising: the described phosphor wheel; a blue laser source for applying a blue laser to the interface between the second phosphor region and the first phosphor region, thereby simultaneously exciting the second phosphor region and the first phosphor region to form a first white light; a splitter for splitting the first white light into a first red light, a first blue light, and a first green light; a filter for modulating the first red light to a second red light, for modulating the first blue light to a second blue light, and for modulating the first green light to a second green light; and an optical combiner for combing the second red light, the second blue light, and the second green light to form a second white light.

One embodiment of the disclosure provides a white light illumination device, comprising: the described phosphor wheel; a blue laser source for applying a blue laser to the interface between the first phosphor region and the second phosphor region, thereby simultaneously exciting the first phosphor region and the second phosphor region to form a first white light; a splitter for splitting the first white light into a first yellow light and a first blue light; a filter for modulating the first yellow light to a second yellow light, and for modulating the first blue light to a second blue light; and an optical combiner for combing the second yellow light and the second blue light to form a second white light.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
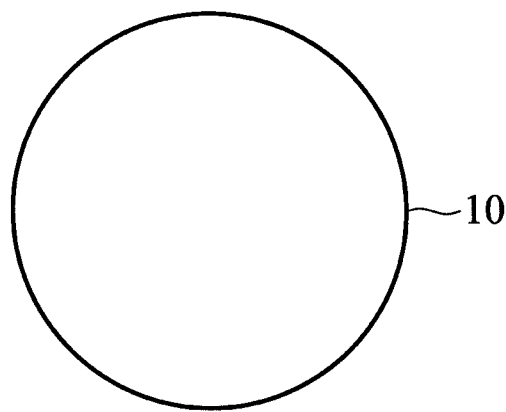
FIG. 1 shows a top view of a conventional phosphor wheel.
Figure 2:
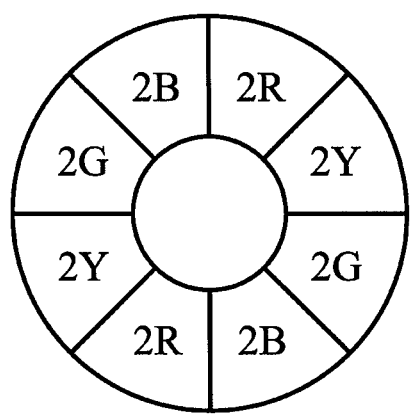
FIG. 2 shows a top view of another conventional phosphor wheel.
Figure 3:
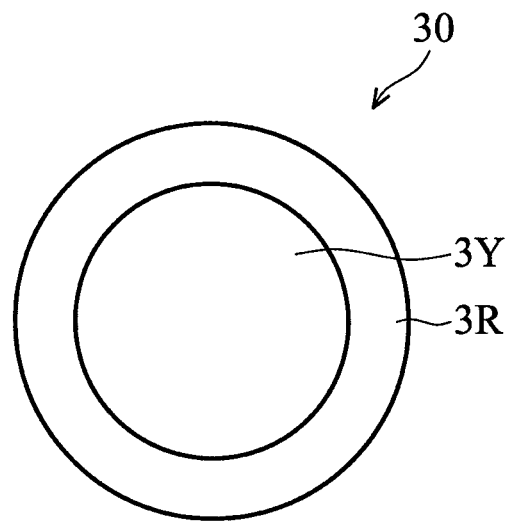
FIG. 3 shows a top view of a phosphor wheel in one embodiment of the disclosure.

In one embodiment, the first phosphor may have an exciting wavelength of 430 nm to 470 nm and a dominant emission wavelength of 520 nm to 560 nm, such as $Y_3Al_5O_{12}$, $Lu_3Al_5O_{12}$, or $\beta$-Sialon, denoted as yellow phosphor. In one embodiment, the second phosphor may have an exciting wavelength of 400 nm to 460 nm and a dominant emission wavelength of 590 nm to 680 nm, such as $CaAlSiN_3$, $Sr_2Si_5N_8$, or $\alpha$-Sialon, further denoted as red phosphor FIG. 3 shows a top view of a phosphor wheel 30 in one embodiment of the disclosure. In FIG. 3, the yellow phosphor region 3Y and the red phosphor region 3R are disposed on a substrate (not shown). The yellow phosphor region 3Y and the red phosphor region 3R are concentric patterns without any space between their interface, and the red phosphor region 3R is set to surround the yellow phosphor region 3Y.

Figure 4:
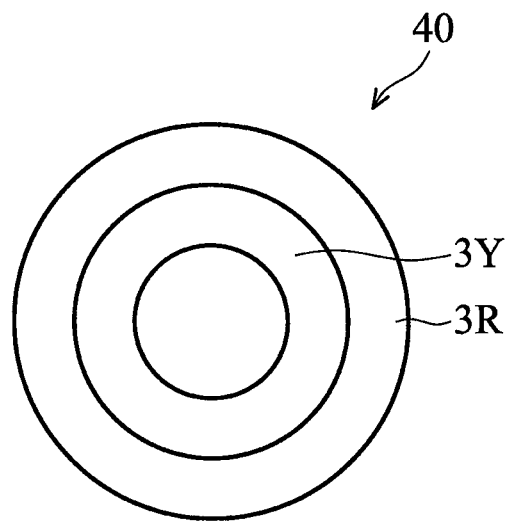
FIG. 4 shows a top view of another phosphor wheel in one embodiment of the disclosure.

As shown in FIG. 3, the yellow phosphor region 3Y is a solid circle shape with a diameter within 3 cm to 16 cm. Herein, the preferable diameter is ranged of 3.5 cm to 9.5 cm. In another embodiment, the yellow phosphor region 3Y is a hollow ring shape with an inner diameter within 2.5 cm to 15.5 cm. Herein, the preferable diameter is ranged of 3 cm to 9 cm and an outer diameter of 3.5 cm to 9.5 cm, as shown in FIG. 4. The yellow phosphor region 3Y having the solid circle shape in FIG. 3 may save labor cost, and the yellow phosphor region 3Y having the hollow ring shape in FIG. 4 may save material cost. A yellow phosphor region 3Y in FIG. 4 having an overly long inner diameter may cause an insufficient exposure area for a blue laser exposing the yellow phosphor region 3Y, thereby producing a white light with color shift.

In one embodiment, the red phosphor region 3R has a hollow ring shape with an inner diameter within 3 cm to 16 cm and an outer diameter of 3.5 cm to 16.5 cm. Herein, the preferable diameter is ranged of 3.5 cm to 9.5 cm and an outer diameter of 4 cm to 10 cm. The inner diameter of the red phosphor region (outer ring) 3R is equal to the outer diameter of the yellow phosphor region (inner ring) 3Y, or equal to the diameter of the yellow phosphor region (solid circle) 3Y. A red phosphor region 3R having an overly short outer diameter may cause an insufficient exposure area for a blue laser exposing the red phosphor region 3R, thereby producing a white light with color shift.

In one embodiment, the red phosphor region 3R and the yellow phosphor region 3Y have a phosphor layer with a thickness of 80 μm to 200 μm. An overly thick phosphor layer will degrade light output due to excessive amount of phosphor particles. An overly thin phosphor layer may cause an insufficient brightness due to overly low phosphor concentration.

Figure 5:
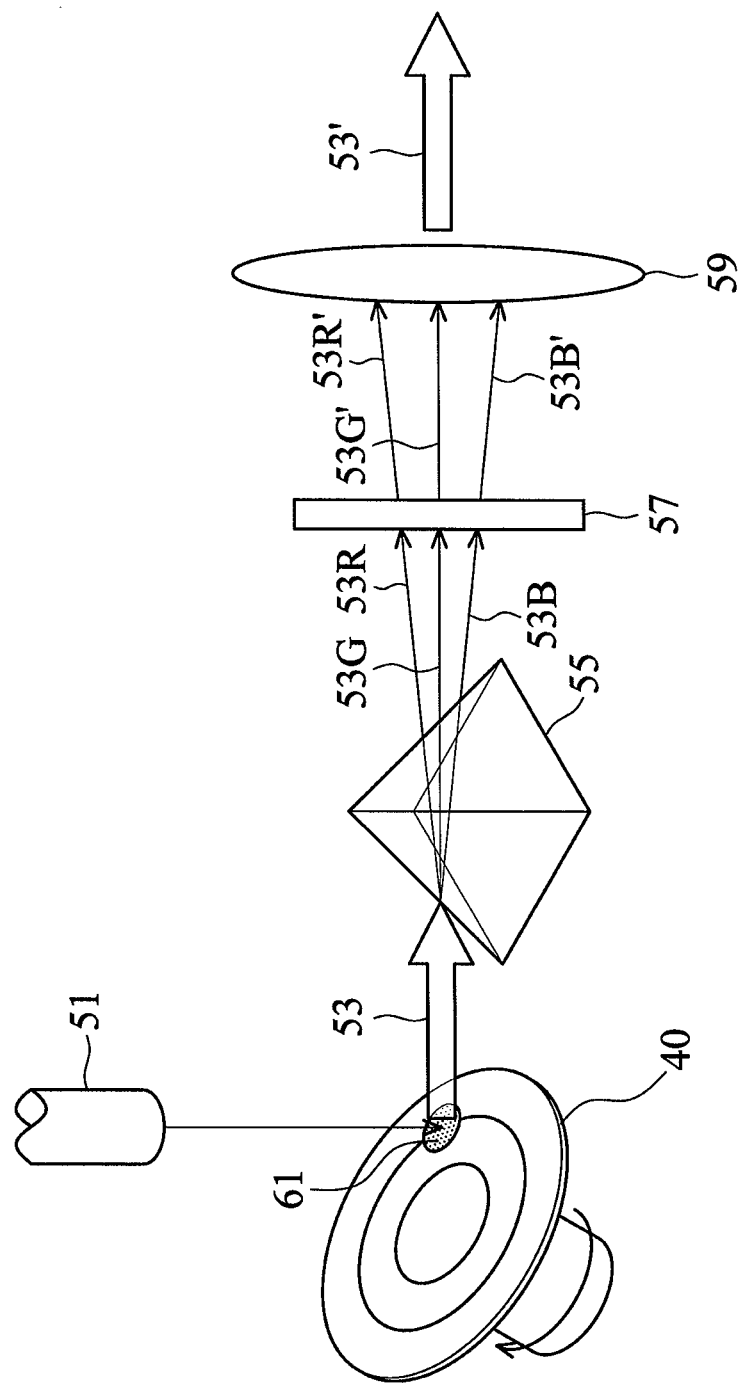
FIG. 5 shows a white light illumination device in one embodiment of the disclosure.

A white light illumination device 50 containing the phosphor wheel 40 in FIG. 4 is illustrated below to explain the white light illumination mechanism in the disclosure. As shown in FIG. 5, a blue laser source 51 applies a blue laser to the rotated phosphor wheel 40, such that the blue laser averagely exposes the entire interface between the red phosphor region 3R and the yellow phosphor region 3Y. As such, no phosphor in the phosphor regions 3R and 3Y is thermally damaged due to being exposed at a fixed point for a long time.

Figure 6:
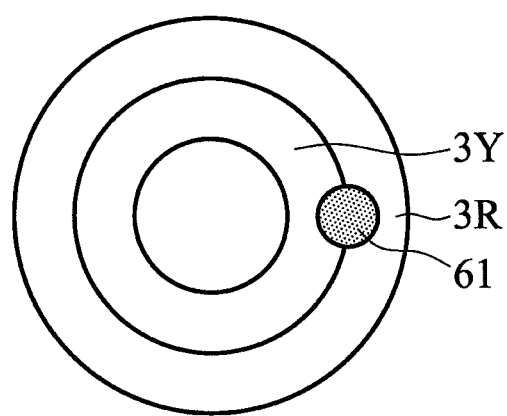
FIG. 6 shows a region (of a phosphor wheel) exposed to a blue laser in one embodiment of the disclosure.

As shown in FIG. 6, the blue laser exposes an exposure region 61, e.g. the interface between the red phosphor region 3R and the yellow phosphor region 3Y, to simultaneously excite the red phosphor region 3R and the yellow region 3Y for simultaneously emitting a red light and a yellow light. The blue light from the blue laser can be collocated with the red light and the yellow light to form a white light 53. In one embodiment, the red phosphor region 3R exposed to the blue laser and the yellow phosphor region 3Y exposed to the blue laser have an exposure-area ratio of 1:10 to 1:0.1. In one embodiment, the red phosphor region 3R exposed to the blue laser and the yellow phosphor region 3Y exposed to the blue laser have an exposure area ratio of 1:3 to 3:1. In another embodiment, the red phosphor region 3R exposed to the blue laser and the yellow phosphor region 3Y exposed to the blue laser have an exposure area ratio of 1:1.2 to 1:0.8. If the red phosphor region 3R is exposed to the blue laser with an overly large exposure area, the red light output will be too high. As such, the white light will have a red-shifted color coordination and a lower color temperature. If the yellow phosphor region 3Y is exposed to the blue laser with an overly large exposure area, the yellow light output will determine the white light color coordination, and the white light will have a high color temperature. It should be understood that the exposure region 61 has a spot shape in FIG. 6, however, the exposure region 61 actually has a ring shape due to rotation of the phosphor wheel 40.

As shown in FIG. 5, the splitter 55 (such as a grating and/or a prism) splits the white light 53 into a red light 53R, a blue light 53B, and a green light 53G (or splits the white light 53 into a yellow light and a blue light). The brightness of the red light 53R, the blue light 53B, and the green light 53G (or the brightness of the yellow light and the blue light) are measured, respectively. Next, the light of a color with the lowest brightness is selected as a standard, and the brightness and the color coordination of other lights of other colors are modulated by filter 57 (e.g. color filter) to obtain modulated lights. The modulated red light 53R', the modulated blue light 53B', and the modulated green light 53G' (or the modulated yellow light and the modulated blue light) are combined by an optical combiner 59 such as lens or photoconductor to form a white light 53'. In one embodiment, the white light 53' has a CIE coordination of (0.3127, 0.3290).

Figure 7:
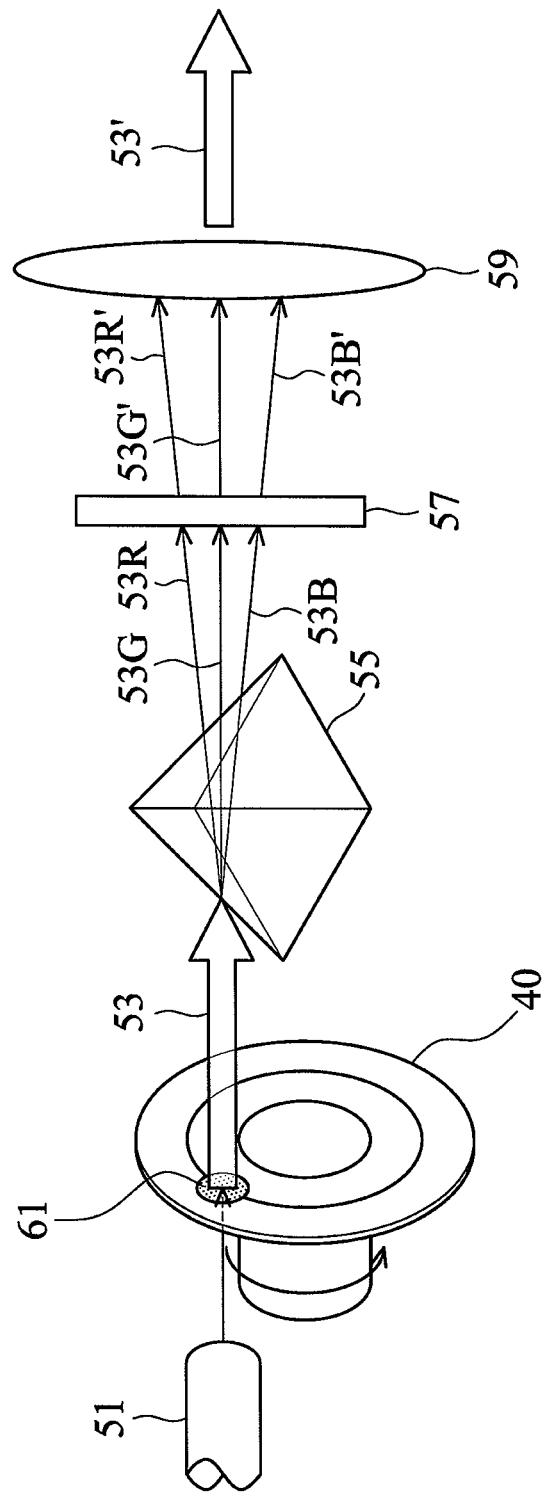
FIG. 7 shows a white light illumination device in one embodiment of the disclosure.

In FIG. 5, the substrate of the phosphor wheel 40 is a reflective material such as metal or dielectric glass. Alternatively, the substrate of the phosphor wheel can be a transparent material if necessary. When the substrate of the phosphor wheel is transparent, the optical path of the white light 53' (produced by exposing the blue laser to the phosphor wheel) is shown in FIG. 7.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

In the following examples, substrates of the phosphor wheel had a diameter of 55 mm. The outer ring phosphor region had an outer diameter of 55 mm and an inner diameter of 50 mm. The inner ring phosphor region had an outer diameter of 50 mm and an inner diameter of 44 mm. The phosphor layer had a thickness of 100 μm. The red phosphor was $CaAlSiN_3$, the yellow phosphor was $Y_3Al_5O_{12}$, and the green phosphor was $Lu_3Al_5O_{12}$. The blue laser had a wavelength of 445 nm. In following examples, the blue light had a CIE coordination of (0.150, 0.060), the green light had a CIE coordination of (0.300, 0.600), and the red light had CIE coordination of (0.640, 0.330), respectively. For achieving a white light with a CIE coordination of (0.3127, 0.3290), the red light, the blue light, and the green light had an excellent combination ratio of 20~22%:4~5%:70~75%, respectively.

Example 1

60 wt % of the yellow phosphor and 40 wt % of silica gel were evenly mixed. The mixture was formed on the entire substrate to form a phosphor wheel with a yellow phosphor layer. The rotated phosphor wheel was exposed to the blue laser to form an initial white light. The initial white light was split into a red light, a blue light, and a green light by a splitter. The red light, the blue light, and the green light were modulated by a filter, and then combined to form a final white light. The brightness of the initial white light, the red light, the blue light, the green light, and the final white light are tabulated in Table 1. In addition, the effective ratio of the initial white light is also tabulated in Table 1.

Example 2

30 wt % of the yellow phosphor, 30 wt % of the red phosphor, and 40 wt % of silica gel were evenly mixed. The mixture was formed on all of the substrate to form a phosphor wheel with a red-yellow phosphor mixture layer. The rotated phosphor wheel was exposed to the blue laser to form an initial white light. The initial white light was split into a red light, a blue light, and a green light by a splitter. The red light, the blue light, and the green light were modulated by a filter, and then combined to form a final white light. The brightness of the initial white light, the red light, the blue light, the green light, and the final white light are tabulated in Table 1. In addition, the effective ratio of the initial white light is also tabulated in Table 1.

Example 3

The yellow phosphor (60 wt %) was formed on the inner ring region of the substrate, and the red phosphor (60 wt %) was formed on the outer ring region of the substrate to form a phosphor wheel. The interface between the red phosphor region (outer ring region) and the yellow phosphor region (inner ring region) of the rotated phosphor wheel was exposed to the blue laser to form an initial white light. The initial white light was split into a red light, a blue light, and a green light by a splitter. The red light, the blue light, and the splitter was modulated by a filter, and then combined to form a final white light. The brightness of the initial white light, the red light, the blue light, the green light, and the final white light are tabulated in Tables 1 and 2. In addition, the effective ratio of the initial white light is also tabulated in Tables 1 and 2. In this Example, the red phosphor region exposed to the blue laser and the yellow phosphor region exposed to the blue laser have an exposure area ratio of 1:1.

TABLE 1

|  | Example 1 | Example 2 | Example 3 |
|---|---|---|---|
| Initial white light brightness ($lm/W_{445\,nm}$) | 201.4 | 105.7 | 149.3 |
| Red light brightness ($lm/W_{445\,nm}$) | 12.1 | 35 | 25 |
| Green light brightness ($lm/W_{445\,nm}$) | 146.3 | 27.7 | 81.3 |
| Blue light brightness ($lm/W_{445\,nm}$) | 43 | 43 | 43 |
| Final white light brightness ($lm/W_{445\,nm}$) | 54.9 | 36.7 | 108.3 |
| Effective ratio of the initial white light | 27.3% | 34.7% | 72.5% |

As shown in Table 1, the design of the concentric rings of red and yellow phosphors in the disclosure has a higher final white light brightness and a higher effective ratio of the initial white light than that of the mixture of the red and yellow phosphors.

Example 4-1

Example 4-1 was similar to Example 3, with the difference in Example 4 being the red phosphor region exposed to the blue laser and the yellow phosphor region exposed to the blue laser having an exposure area ratio of 3:1.

Example 4-2

Example 4-2 was similar to Example 3, with the difference in Example 4 being the red phosphor region exposed to the blue laser and the yellow phosphor region exposed to the blue laser having an exposure area ratio of 1:3.

Example 5

The green phosphor (60 wt %) was formed on the inner ring region of the substrate, and the red phosphor (60 wt %) was formed on the outer ring region of the substrate to form a phosphor wheel. The interface between the red phosphor region (outer ring region) and the green phosphor region (inner ring region) of the rotated phosphor wheel was exposed to the blue laser to form an initial white light. The initial white light was split into a red light, a blue light, and a green light by a splitter. The red light, the blue light, and the splitter was modulated by a filter, and then combined to form a final white light. The brightness of the initial white light, the red light, the blue light, the green light, and the final white light are tabulated in Table 2. In addition, the effective ratio of the initial white light is also tabulated in Table 2. In this Example, the red phosphor region exposed to the blue laser and the green phosphor region exposed to the blue laser have an exposure area ratio of 1:1.

TABLE 2

|  | Example 3 | Example 4-1 | Example 4-2 | Example 5 |
|---|---|---|---|---|
| Initial white light brightness ($lm/W_{445\,nm}$) | 149.3 | 115.6 | 163.2 | 162.2 |
| Red light brightness ($lm/W_{445\,nm}$) | 25 | 32.4 | 21.6 | 23.6 |
| Green light brightness ($lm/W_{445\,nm}$) | 81.3 | 40.2 | 98.6 | 95.5 |
| Blue light brightness ($lm/W_{445\,nm}$) | 43 | 43 | 43 | 43 |
| Final white light brightness ($lm/W_{445\,nm}$) | 108.3 | 53.9 | 101 | 110 |
| Effective ratio of the initial white light | 72.5% | 46.6% | 61.9% | 67.8% |

As shown in Table 2, the phosphor wheel design in Example 5 (green inner ring and red outer ring) has a higher final white light brightness than that of the phosphor wheel design in Example 3 (yellow inner ring and red outer ring). However, the effective ratio of the initial white light of Example 5 is lower than that of Example 3 due to overly high green light brightness from the initial white light in Example 5. For achieving the desired white light color, the excessive green light in Example 5 should be filtered out. The filtered out green light cannot be utilized again. Moreover, the filtered out green light has other problems such as energy consumption, heat dissipation, and the likes.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A phosphor wheel, comprising:
a substrate;
a first phosphor region on the substrate; and a second phosphor region on the substrate,
wherein the first phosphor region and the second phosphor region are concentric patterns without any space between their interface, and the second phosphor region is set to surround the first phosphor region,
wherein the interface of the first phosphor region and the second phosphor region is used to receive a blue laser from a blue laser source so as to simultaneously excite the first phosphor region and the second phosphor region to form a first white light.

2. The phosphor wheel as claimed in claim 1, wherein the first phosphor region has a solid circle shape with a diameter of 3 cm to 16 cm.

3. The phosphor wheel as claimed in claim 1, wherein the first phosphor region has a solid circle shape with a diameter of 3.5 cm to 9.5 cm.

4. The phosphor wheel as claimed in claim 1, wherein the first phosphor region has a ring shape with an inner diameter of 2.5 cm to 15.5 cm.

5. The phosphor wheel as claimed in claim 1, wherein the first phosphor region has a ring shape with an inner diameter of 3 cm to 9 cm and an outer diameter of 3.5 cm to 9.5 cm.

6. The phosphor wheel as claimed in claim 1, wherein the second phosphor region has a ring shape with an inner diameter of 3 cm to 16 cm, and an outer diameter of 3.5 cm to 16.5 cm.

7. The phosphor wheel as claimed in claim 1, wherein the second phosphor region has a ring shape with an inner diameter of 3.5 cm to 9.5 cm, and an outer diameter of 4 cm to 10 cm.

8. The phosphor wheel as claimed in claim 1, wherein both the first phosphor region and the second phosphor region have a phosphor layer with a thickness of 80 μm to 200 μm.

9. The phosphor wheel as claimed in claim 1, wherein the first phosphor region has an exciting wavelength of 430 nm to 470 nm, and a dominant emission wavelength of 520 nm to 560 nm.

10. The phosphor wheel as claimed in claim 1, wherein the second phosphor region has an exciting wavelength of 400 nm to 460 nm, and a dominant emission wavelength of 590 nm to 680 nm.

11. A white light illumination device, comprising:
the phosphor wheel as claimed in claim 1;
the blue laser source for applying the blue laser to the interface between the second phosphor region and the first phosphor region, thereby simultaneously exciting the second phosphor region and the first phosphor region to form the first white light;
a splitter for splitting the first white light into a first red light, a first blue light, and a first green light;
a filter for modulating the first red light to a second red light, for modulating the first blue light to a second blue light, and for modulating the first green light to a second green light; and
an optical combiner for combining the second red light, the second blue light, and the second green light to form a second white light.

12. The white light illumination device as claimed in claim 11, wherein the second white light has a CIE coordination of (0.3127, 0.3290).

13. The white light illumination device as claimed in claim 11, wherein the first phosphor region is exposed to the blue laser; and
the second phosphor region is exposed to the blue laser,
wherein the first phosphor region and the second phosphor region have an exposure area ratio of 1:10 to 1:0.1.

14. A white light illumination device, comprising:
the phosphor wheel as claimed in claim 1;
the blue laser source for applying the blue laser to the interface between the second phosphor region and the first phosphor region, thereby simultaneously exciting the second phosphor region and the first phosphor region to form the first white light;
a splitter for splitting the first white light into a first yellow light and a first blue light;
a filter for modulating the first yellow light to a second yellow light, and for modulating the first blue light to a second blue light; and
an optical combiner for combining the second yellow light and the second blue light to form a second white light.

15. The white light illumination device as claimed in claim 14, wherein the second white light has a CIE coordination of (0.3127, 0.3290).

16. The white light illumination device as claimed in claim 14, wherein the first phosphor region is exposed to the blue laser; and
the second phosphor region is exposed to the blue laser,
wherein the first phosphor region and the second phosphor region have an exposure area ratio of 1:10 to 1:0.1.

* * * * *